United States Patent
Kim

(10) Patent No.: US 8,968,199 B2
(45) Date of Patent: Mar. 3, 2015

(54) SPATIAL COMPOUND IMAGING IN AN ULTRASOUND SYSTEM

(75) Inventor: Jeong Sik Kim, Seoul (KR)

(73) Assignee: Samsung Medison Co., Ltd., Gangwon-Do (KR)

(*) Notice: Subject to any disclaimer, the term of this patent is extended or adjusted under 35 U.S.C. 154(b) by 1125 days.

(21) Appl. No.: 12/949,430

(22) Filed: Nov. 18, 2010

(65) Prior Publication Data

US 2011/0118605 A1 May 19, 2011

(30) Foreign Application Priority Data

Nov. 19, 2009 (KR) ........................ 10-2009-0111745

(51) Int. Cl.
- *A61B 8/00* (2006.01)
- *G01S 15/89* (2006.01)
- *G01S 7/52* (2006.01)

(52) U.S. Cl.
CPC ......... *G01S 15/8995* (2013.01); *G01S 7/52049* (2013.01); *G01S 7/52034* (2013.01)
USPC ............ 600/437; 600/447; 600/443; 600/439

(58) Field of Classification Search
USPC .................................. 600/437, 443, 447, 439
See application file for complete search history.

(56) References Cited

U.S. PATENT DOCUMENTS

| | | | |
|---|---|---|---|
| 5,172,343 | A | 12/1992 | O'Donnell |
| 6,117,081 | A | 9/2000 | Jago et al. |
| 6,126,598 | A | 10/2000 | Entrekin et al. |
| 6,283,917 | B1 | 9/2001 | Jago et al. |
| 6,554,770 | B1 * | 4/2003 | Sumanaweera et al. ...... 600/443 |
| 6,778,885 | B2 | 8/2004 | Agashe et al. |
| 6,789,427 | B2 | 9/2004 | Batzinger et al. |
| 7,072,494 | B2 | 7/2006 | Georgescu et al. |
| 2004/0050166 | A1 | 3/2004 | Batzinger et al. |

(Continued)

FOREIGN PATENT DOCUMENTS

| | | |
|---|---|---|
| JP | 9-224938 A | 9/1997 |
| JP | 2003-534074 | 11/2003 |

(Continued)

OTHER PUBLICATIONS

Korean Notice of Allowance issued in Korean Patent Application No. 10-2009-0111745 dated Jul. 30, 2012.

(Continued)

*Primary Examiner* — Joel Lamprecht
(74) *Attorney, Agent, or Firm* — McDermott Will & Emery LLP

(57) ABSTRACT

Embodiments for forming an ultrasound spatial compound image by correcting refraction of ultrasound signals in an ultrasound system are disclosed herein. An ultrasound data acquisition unit forms a first set of ultrasound frame data and a second set of ultrasound frame data by using non-steered scan lines and steered scan lines, respectively. The processor, which is coupled to the ultrasound data acquisition unit, forms a plurality of sets of resampled ultrasound frame data based on the second set of ultrasound frame data, selects one particular set of ultrasound frame data from the group consisting of the second set of ultrasound frame data and the plurality of sets of resampled ultrasound frame data based on the first set of ultrasound frame data and spatially compounds the one particular set of ultrasound frame data and the first set of ultrasound frame data to form an ultrasound spatial compound image.

14 Claims, 3 Drawing Sheets

(56) References Cited

U.S. PATENT DOCUMENTS

| | | |
|---|---|---|
| 2005/0124891 A1 | 6/2005 | Amemiya |
| 2005/0228276 A1* | 10/2005 | He et al. ............... 600/437 |
| 2008/0071175 A1 | 3/2008 | Lee et al. |

FOREIGN PATENT DOCUMENTS

| | | |
|---|---|---|
| JP | 2004-109129 A | 4/2004 |
| JP | 2005-526225 A | 9/2005 |
| JP | 2007-523429 A | 8/2007 |
| KR | 10-0653575 B1 | 12/2006 |
| KR | 10-2007-0024096 A | 3/2007 |
| KR | 10-0923026 B1 | 10/2009 |
| WO | WO 00/20885 | 4/2000 |
| WO | WO 01/90776 A2 | 11/2001 |

OTHER PUBLICATIONS

European Search Report issued in European Patent Application No. EP 10190718.6 dated Mar. 30, 2011.
Non-Final Rejection JP Patent Application No. 2010-259246 dated May 27, 2014 with partial English translation.

* cited by examiner

SPATIAL COMPOUND IMAGING IN AN ULTRASOUND SYSTEM

CROSS-REFERENCE TO RELATED APPLICATIONS

The present application claims priority from Korean Patent Application No. 10-2009-0111745 filed on Nov. 19, 2009, the entire subject matter of which is incorporated herein by reference.

TECHNICAL FIELD

Embodiments described herein relate generally to ultrasound systems, and more particularly to spatial compound imaging, by which diffraction of ultrasound signals, which may be caused by substances between transducer elements and a target object, can be corrected in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional images of internal features of an object (e.g., human organs).

The ultrasound system employs an ultrasound probe containing a transducer array for transmission and reception of ultrasound signals. The ultrasound signals are transmitted along scan lines aligned with a direction of a scan head of the ultrasound probe. The ultrasound system forms ultrasound images based on the received ultrasound signals. Recently, the technique of transmitting the ultrasound signals by steering scan lines at multiple steering angles to obtain multiple ultrasound images and spatially compounding the ultrasound images (spatial compound imaging) has been used to obtain an enhanced ultrasound image.

Generally, the probe may include a lens formed on a transducer array for focusing the ultrasound signals. When the ultrasound signals, which are generated from the transducer array, are transmitted to the target object along scan lines steered at a predetermined steering angle, the ultrasound signals may be refracted due to a difference in velocity of sound when the ultrasound signals pass through the lens and when the ultrasound signals pass the target object. Also, a velocity difference may be caused when the ultrasound signals propagate through various tissues in the target object. The refraction may cause distortion of directivity of echo signals and errors in estimating locations and azimuth of ultrasound data. Thus, when the ultrasound images formed at different multiple steering angles are spatially compounded to form a spatial compound image, mis-registration between the ultrasound images may occur. Thus, blurring may appear in the spatial compound image.

SUMMARY

Embodiments for forming an ultrasound spatial compound image by correcting refraction of ultrasound signals in an ultrasound system are disclosed herein. In one embodiment, by way of non-limiting example, an ultrasound system comprises: an ultrasound data acquisition unit configured to form a first set of ultrasound frame data and a second set of ultrasound frame data by using non-steered scan lines and steered scan lines, respectively, the steered scan lines being steered at a predetermined steering angle with respect to the non-steered scan lines; and a processor coupled to the ultrasound data acquisition unit and configured to form a plurality of sets of resampled ultrasound frame data based on the second set of ultrasound frame data, select one particular set of ultrasound frame data from the group consisting of the second set of ultrasound frame data and the plurality of sets of resampled ultrasound frame data based on the first set of ultrasound frame data and spatially compound the one particular set of ultrasound frame data and the first set of ultrasound frame data to form an ultrasound spatial compound image.

In another embodiment, an ultrasound system comprises: an ultrasound data acquisition unit configured to transmit ultrasound signals toward a target object along non-steered scan lines and steered scan lines respectively steered at a predetermined steering angle with respect to the non-steered scan lines and receive echo signals to thereby form a plurality of sets of ultrasound frame data each being indicative of a target object, the plurality of sets of ultrasound frame data including a first set of ultrasound frame data formed based on the non-steered scan lines and a second set of ultrasound frame data formed based on the steered scan lines; and a processor coupled to the ultrasound data acquisition unit and configured to set a plurality of sub steering angles based on the predetermined steering angle and resample the second set of ultrasound frame data based on the plurality of sub steering angles to form a plurality of sets of resampled ultrasound frame data, the processor being further configured to compare the first set of ultrasound frame data with each of the sets including the second set of ultrasound frame data and the plurality of sets of resampled ultrasound frame data to select a particular set of ultrasound frame data and spatially compound the selected particular set of ultrasound frame data and the first set of ultrasound frame data to form an ultrasound spatial compound image.

In yet another embodiment, a method of forming an ultrasound spatial compound image, comprises: a) transmitting ultrasound signals to a target object along non-steered scan lines and receiving echo signals from the target object to form a first set of ultrasound frame data; b) transmitting ultrasound signals to the target object along steered scan lines respectively steered at a predetermined steering angle with respect to the non-steered scan lines and receiving echo signals to thereby form a second set of ultrasound frame data; c) resampling the second set of the ultrasound frame data based on a plurality of sub steering angles set based on the predetermined steering angles to form a plurality of sets of resampled ultrasound frame data; d) comparing the first set of ultrasound frame data with each of the sets including the second set of ultrasound frame data and the plurality of sets of resampled ultrasound frame data to select a particular set of ultrasound frame data; and e) spatially compounding the selected particular set of ultrasound frame data and the first set of ultrasound frame data to form an ultrasound spatial compound image.

In still yet another embodiment, a computer-readable storage medium storing instructions that, when executed by a computer, cause the computer to perform a spatial compound image forming method comprises: a) reading out a plurality of sets of ultrasound frame data corresponding to a plurality of frames based on echo signals from a target object from a storage unit, the plurality of sets of ultrasound frame data including a first set of ultrasound frame data formed based on non-steered scan lines and a second set of ultrasound frame data formed based on steered scan lines respectively steered at a predetermined steering angles; b) resampling the second sets of frame data based on a plurality of sub steering angles set based on a permissible refraction range for each of the predetermined steering angles to form a plurality of sets of resampled frame data; c) comparing the first set of ultrasound frame data with the plurality of sets of resampled frame data to select a particular set of frame data; and d) spatially compounding the selected particular set of ultrasound frame data and the first set of ultrasound frame data to form an ultrasound spatial compound image.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
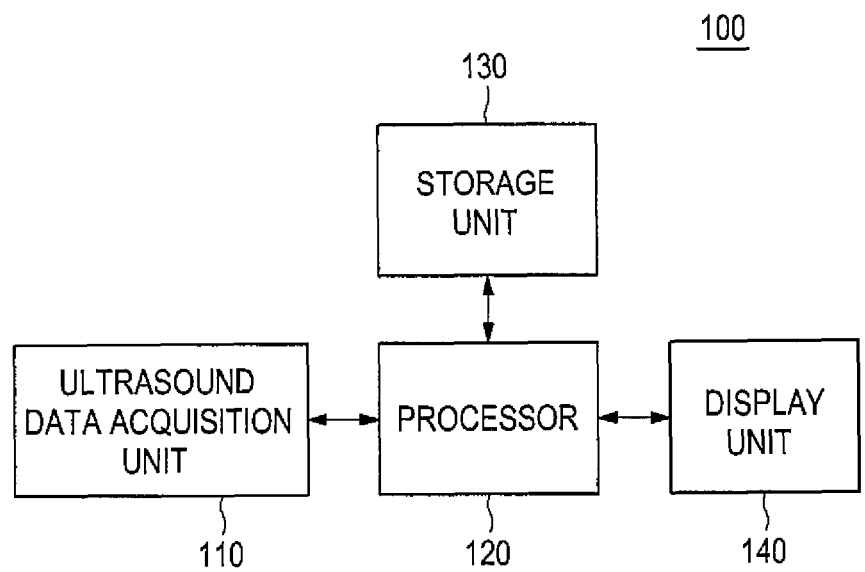
FIG. 1 is a block diagram showing an illustrative embodiment of an ultrasound system.

FIG. 1 is a block diagram showing an illustrative embodiment of an ultrasound system. As shown in FIG. 1, an ultrasound system 100 constructed in accordance with one embodiment is shown. The ultrasound system 100 may include an ultrasound data acquisition unit 110. The ultrasound data acquisition unit 110 may be configured to transmit ultrasound beams to a target object and receive ultrasound echoes reflected from the target object to thereby form ultrasound data representative of the target object.

Figure 2:
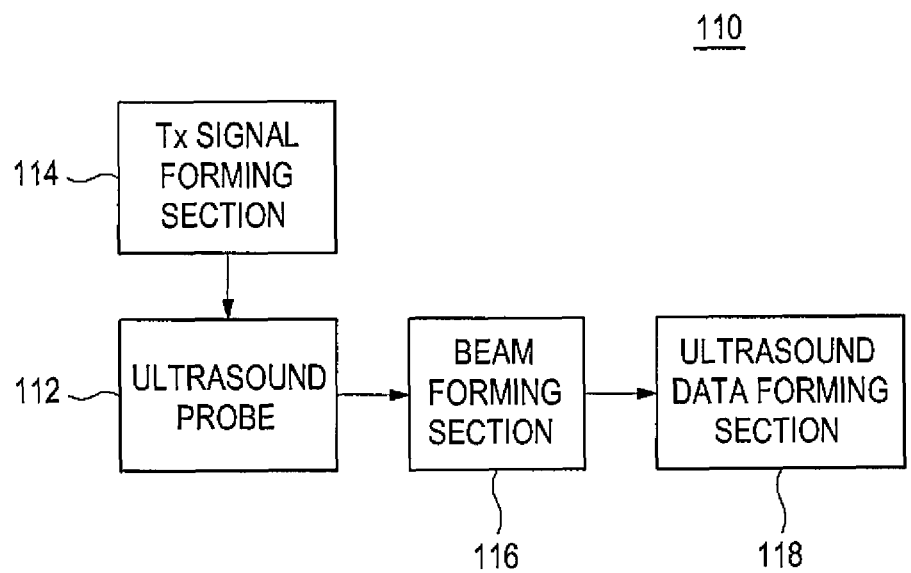
FIG. 2 is a block diagram showing an illustrative embodiment of an ultrasound data acquisition unit.
Figure 4:
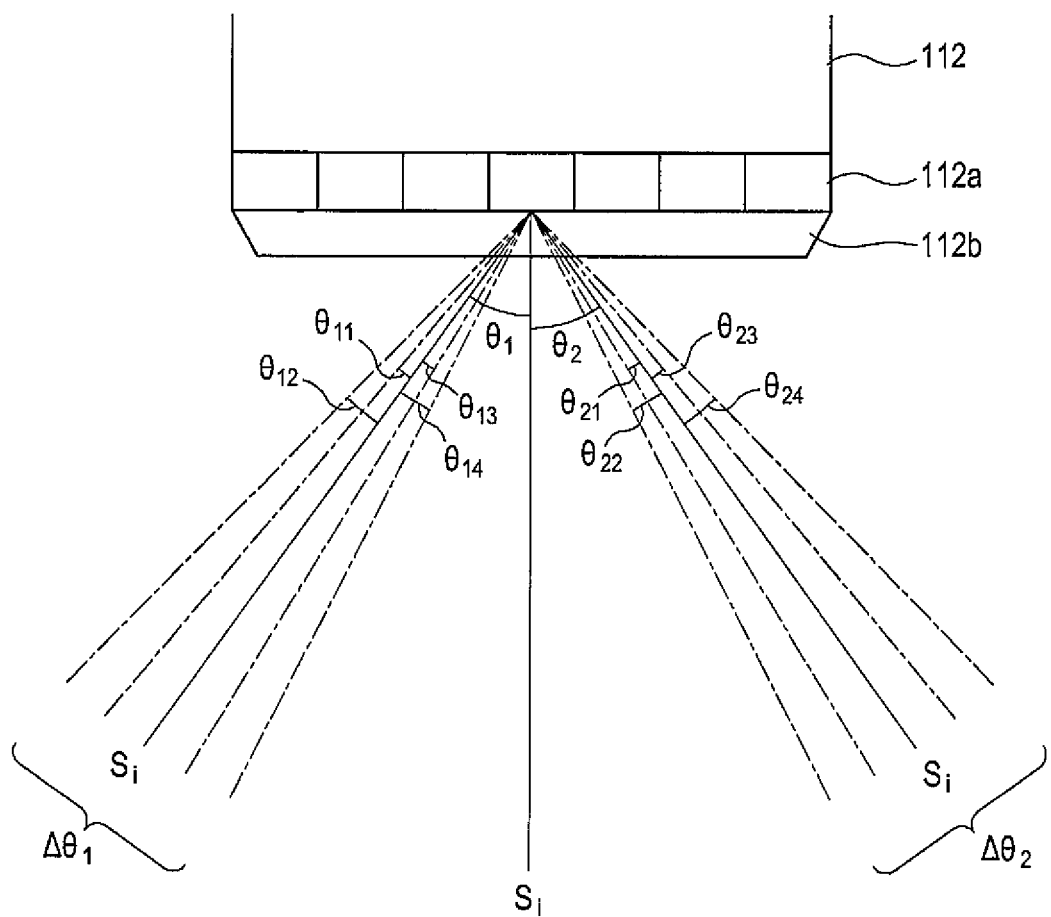
FIG. 4 is a schematic diagram showing an example of setting scan lines steered at multiple steering angles.

Referring to FIGS. 2 and 4, the ultrasound data acquisition unit 110 may include an ultrasound probe 112. The ultrasound probe 112 may include a plurality of transducer elements 112a and a lens 112b mounted on the transducer elements 112a. The transducer elements 112a may be configured to generate ultrasound signals, which may be propagated into a target object. In one embodiment, the ultrasound probe 112 may include any one of a linear probe, a convex probe and the like.

The transmission of the ultrasound signals may be controlled by a transmission (Tx) signal forming section 114 that is coupled to the ultrasound probe 112. The Tx signal forming section 114 may include a plurality of pulsers to generate Tx signals. The Tx signal forming section 114 may be further configured to apply delays to the Tx signals to thereby output Tx signals having a specific Tx pattern. The delays may be determined according to an image mode and scan lines. In one embodiment, by way of non-limiting example, the image mode may include a brightness mode (B mode) for acquiring a B-mode image frame. The transducer elements 112a may be actuated in response to the Tx signals to thereby output ultrasound signals.

In one embodiment, the Tx signal forming section 114 may be configured to output first Tx signals, and the transducer elements 112a may output first ultrasound signals being focused along non-steered scan lines in response to the first Tx signals. The Tx signal forming section 114 may be further configured to output second Tx signals. The transducer elements 112a may output second ultrasound signals, which may focus along scan lines steered at a first predetermined steering angle $\theta_1$, in response to the second Tx signals. The Tx generating section 114 may be further operable to output third Tx signals. The transducer elements 112a may output third ultrasound signals, which may focus along scan lines steered at a second predetermined steering angle $\theta_2$, in response to the third Tx signals. In one embodiment, the first to third Tx signals may be repeatedly generated in a sequential manner.

The transducer elements 112a of the ultrasound probe 112 may receive ultrasound echoes reflected from the target object and then output electrical receive signals. The receive signals may include first receive signals obtained in response to the transmission of the first ultrasound signals, second receive signals obtained in response to the transmission of the second ultrasound signals, and third receive signals obtained in response to the transmission of the third ultrasound signals.

The ultrasound data acquisition unit 110 may further include a beam forming section 116, which may be coupled to the ultrasound probe 112. The beam forming section 116 may be configured to digitize the electrical receive signals to obtain digital signals. The beam forming section 116 may be further configured to apply delays to the digital signals in consideration of distances between the transducer elements 112a of the ultrasound probe 112 and the focal points. The beam forming section 116 may be also configured to sum the delayed digital signals to form receive-focused beams. In one embodiment, the receive-focused beams may include first receive-focused beams formed based on the first receive signals, second receive-focused beams formed based on the second receive signals, and third receive-focused beams formed based on the third receive signals.

The ultrasound data acquisition unit 110 may further include an ultrasound data forming section 118, which may be coupled to the beam forming section 116. The ultrasound data forming section 118 may repeatedly receive the first to third receive-focused beams in a sequential manner to thereby form a plurality of sets of ultrasound frame data. The plurality of sets of ultrasound frame data may include a first set of ultrasound frame data formed based on the first receive-focused beams, and second and third sets of ultrasound frame data formed based on the second and third receive-focused beams, respectively. The plurality of sets of ultrasound frame data may be radio frequency data, In-phase/Quadrature data and the like. Further, the ultrasound data acquisition unit 110 may be configured to perform upon the receive-focused beams a variety of signal processing such as gain adjustment, filtering and the like, as required necessary in forming the ultrasound frame data.

The ultrasound system 100 may further include a processor 120, which may be coupled to the ultrasound data acquisition unit 110. The processor 120 may be configured to define permissible refraction ranges of ultrasound signals for the respective steering angles. The permissible refraction ranges may be determined by considering a lens mounted on the transducer elements and a type of target object. The processor 120 may be further configured to perform spatial compound imaging upon the first to third sets of ultrasound frame data based on the permissible refraction ranges to thereby form a spatial compound image. An operation of the processor 120 will be described in detail by referring to FIGS. 3 and 4 below.

Figure 3:
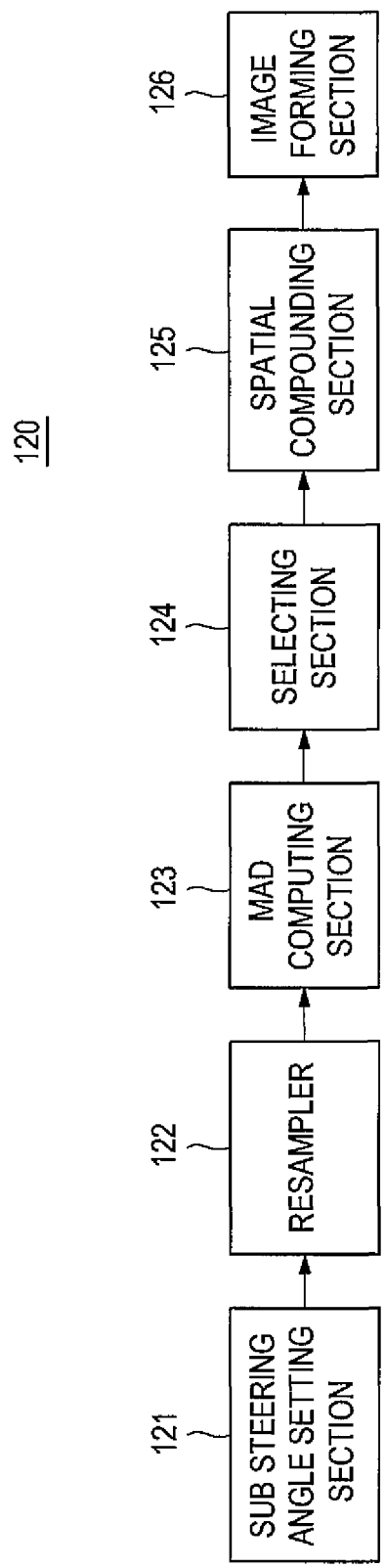
FIG. 3 is a block diagram showing an illustrative embodiment of a processor.

FIG. 3 is a block diagram showing an illustrative embodiment of the processor 120. Referring to FIG. 3, the processor 120 may include a sub steering angle setting section 121. The sub steering angle setting section 121 may be configured to define a permissible range of refraction ("permissible refraction range) of ultrasound signals for each of the first and second predetermined steering angles $\theta_1$ and $\theta_2$. For example, the sub steering angle setting section 121 may define a permissible refraction range $\Delta\theta_1$ with respect to the first predetermined steering angle $\theta_1$ to steer scan lines $S_i$. A plurality of sub steering angles $\theta_{11}$ to $\theta_{14}$ for the first predetermined steering angle $\theta_1$ may be set to be within the permissible refraction range $\Delta\theta_1$. Further, the sub steering angle setting section 121 may define a permissible refraction range $\Delta\theta_2$ with respect to the second predetermined steering angle $\theta_2$ to steer scan lines $S_i$. A plurality of sub steering angles $\theta_{21}$ to $\theta_{24}$ for the second predetermined steering angle $\theta_2$ may be set to be within the permissible refraction range $\Delta\theta_2$. In one embodiment, the plurality of sub steering angles $\theta_{11}$ to $\theta_{14}$ and $\theta_{21}$ to $\theta_{24}$ may be determined by increasing or decreasing the first and second predetermined steering angles $\theta_1$ and $\theta_2$ by a predetermined angle (e.g., 1°), respectively.

The processor 120 may further include a resampler 122, which may be coupled to the sub steering angle setting section 121. The resampler 122 may be configured to resample the second set of ultrasound frame data based on the sub steering angles to form a plurality of sets of resampled ultrasound frame data. The plurality of sets of resampled ultrasound frame data may be stored in a storage unit 130.

In one embodiment, the resampler 122 may be configured to resample the second set of ultrasound frame data based on the scan lines steered at the sub steering angles $\theta_{11}$ to $\theta_{14}$ to thereby form a plurality of first sets of resampled ultrasound frame data corresponding to the sub steering angles $\theta_{11}$ to $\theta_{14}$, respectively. Also, the resampler 122 may be operable to resample the third set of ultrasound frame data based on the scan lines steered at the sub steering angles $\theta_{21}$ to $\theta_{24}$, to thereby form a plurality of second sets of resampled ultrasound frame data corresponding to the sub steering angles $\theta_{21}$ to $\theta_{24}$, respectively.

The processor 120 may further include a mean absolute difference (MAD) computing section 123, which may be coupled to the resampler 122. The MAD computing section 123 may be configured to compute an MAD value between the first set of ultrasound frame data and other set of ultrasound frame data on a pixel basis. In this case, the other set of ultrasound frame data may include the second set of ultrasound frame data, the third set of ultrasound frame data, the first sets of resampled ultrasound frame data, and the second sets of resampled ultrasound frame data. As such, the MAD computing section 123 may obtain one MAD value for each set described above as the other set of ultrasound frame data.

The processor 120 may further include a selecting section 124, which is coupled to the MAD computing section 123. The selecting section 124 may be configured to select particular sets of ultrasound frame data that result in smallest MAD values. In one embodiment, the selecting section 124 may be configured to compare the MAD values, which have been computed between the first set of ultrasound frame data and each of the sets including the second set of ultrasound frame data and the sets of resampled ultrasound frame data associated with the second set of ultrasound frame data, to determine a smallest MAD value. The selecting section 124 may be configured to select a first particular set of ultrasound frame data corresponding to the smallest MAD value. Further, the selecting section 124 may be configured to compare the MAD values, which have been computed between the first set of ultrasound frame data and each of the sets including the third set of ultrasound frame data and the sets of the resampled ultrasound frame data associated with the third set of ultrasound frame data, to determine a smallest MAD value. The selecting section 124 may be configured to select a second particular set of ultrasound frame data corresponding to the smallest MAD value.

The processor 120 may further include a spatial compounding section 125, which may be coupled to the selecting section 124. The spatial compounding section 125 may be configured to perform spatial compounding upon the first set of ultrasound frame data and the selected first and second particular sets of ultrasound frame data to thereby form a set of ultrasound compound frame data.

The processor 120 may further include an image forming section 126, which may be coupled to the spatial compounding section 125. The image forming section 126 may be configured to form an ultrasound spatial compound image based on the set of ultrasound compound frame data.

Referring back to FIG. 1, the storage unit 130 may store the sets of ultrasound frame data, which have been acquired in the ultrasound data acquisition unit 110. Further, the storage unit 130 may store the plurality of sets of resampled ultrasound frame data, which have been formed in the processor 120. The ultrasound system may further include a display unit 140 for displaying the ultrasound spatial compound image. In one embodiment, the display unit 140 may include at least one of a cathode ray tube (CRT) display, a liquid crystal display (LCD), an organic light emitting diode (OLED) display and the like.

In one embodiment, there is provided a computer-readable storage medium storing instructions that, when executed by a computer, cause the computer to perform a spatial compound image forming method. The method may comprise: a) reading out a plurality of sets of ultrasound frame data corresponding to a plurality of frames based on echo signals from a target object from a storage unit, the plurality of sets of ultrasound frame data including a first set of ultrasound frame data formed based on non-steered scan lines and a second set of ultrasound frame data formed based on steered scan lines respectively steered at a predetermined steering angles; b) resampling the second sets of frame data based on a plurality of sub steering angles set based on a permissible refraction range for each of the predetermined steering angles to form a plurality of sets of resampled frame data; c) comparing the first set of ultrasound frame data with the plurality of sets of resampled frame data to select a particular set of frame data; and d) spatially compounding the selected particular set of ultrasound frame data and the first set of ultrasound frame data to form an ultrasound spatial compound image.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
an ultrasound data acquisition unit configured to form a first set of ultrasound frame data and a second set of ultrasound frame data by using non-steered scan lines and steered scan lines, respectively, the steered scan lines being steered at a predetermined steering angle with respect to the non-steered scan lines; and a processor coupled to the ultrasound data acquisition unit and configured to form a plurality of sets of resampled ultrasound frame data based on the second set of ultrasound frame data, select one particular set of ultrasound frame data from the group consisting of the second set of ultrasound frame data and the plurality of sets of resampled ultrasound frame data based on the first set of ultrasound frame data and spatially compound the one particular set of ultrasound frame data and the first set of ultrasound frame data to form an ultrasound spatial compound image.

2. An ultrasound system, comprising:

an ultrasound data acquisition unit configured to transmit ultrasound signals toward a target object along non-steered scan lines and steered scan lines respectively steered at a predetermined steering angle with respect to the non-steered scan lines and receive echo signals to thereby form a plurality of sets of ultrasound frame data each being indicative of a target object, the plurality of sets of ultrasound frame data including a first set of ultrasound frame data formed based on the non-steered scan lines and a second set of ultrasound frame data formed based on the steered scan lines; and a processor coupled to the ultrasound data acquisition unit and configured to set a plurality of sub steering angles based on the predetermined steering angle and resample the second set of ultrasound frame data based on the plurality of sub steering angles to form a plurality of sets of resampled ultrasound frame data, the processor being further configured to compare the first set of ultrasound frame data with each of the sets including the second set of ultrasound frame data and the plurality of sets of resampled ultrasound frame data to select a particular set of ultrasound frame data and spatially compound the selected particular set of ultrasound frame data and the first set of ultrasound frame data to form an ultrasound spatial compound image.

3. The ultrasound system of claim 2, wherein the processor includes:

a sub steering angle setting section configured to define a permissible refraction range for the predetermined steering angles and set the plurality sub steering angles to be within the permissible refraction range;

a resampler configured to resample the second set of ultrasound frame data based on the plurality of sub steering angles to form the plurality of sets of resampled ultrasound frame data;

a mean absolute difference (MAD) computing section configured to compute MAD values between the first set of ultrasound frame data and each of the sets including the second set of ultrasound frame data and the plurality of sets of resampled ultrasound frame data;

a selecting section configured to select the particular set of the ultrasound frame data resulting in a smallest MAD value;

a spatial compounding section configured to spatially compound the first set of ultrasound frame data and the selected particular set of the ultrasound frame data to form a set of ultrasound compound frame data; and an image forming section configured to form the ultrasound spatial compound image by using the set of the ultrasound compound frame data.

4. The ultrasound system of claim 3, wherein the plurality of sub steering angles are set by increasing or decreasing the predetermined steering angle by a predetermined angle within the permissible refraction range.

5. A method of forming an ultrasound spatial compound image, comprising:

a) transmitting ultrasound signals to a target object along non-steered scan lines and receiving echo signals from the target object to form a first set of ultrasound frame data;

b) transmitting ultrasound signals to the target object along steered scan lines respectively steered at a predetermined steering angle with respect to the non-steered scan lines and receiving echo signals to thereby form a second set of ultrasound frame data;

c) resampling the second set of the ultrasound frame data based on a plurality of sub steering angles set based on the predetermined steering angle to form a plurality of sets of resampled ultrasound frame data;

d) comparing the first set of ultrasound frame data with each of the sets including the second set of ultrasound frame data and the plurality of sets of resampled ultrasound frame data to select a particular set of ultrasound frame data; and e) spatially compounding the selected particular set of ultrasound frame data and the first set of ultrasound frame data to form an ultrasound spatial compound image.

6. The method of claim 5, wherein the step c) comprises:

defining a permissible refraction range for the predetermined steering angle;

setting the plurality of sub steering angles to be set within the permissible refraction range; and resampling the second set of the frame data based on the plurality of sub steering angles to form the plurality of sets of resampled ultrasound frame data.

7. The method of claim 6, wherein the plurality of sub steering angles are set by increasing or decreasing each of the predetermined steering angles by a predetermined angle within the permissible refraction range.

8. The method of claim 5, wherein the step d) comprises:

computing MAD values between the first set of ultrasound frame data and each of the sets including the second set of ultrasound frame data and the plurality of sets of resampled ultrasound frame data; and selecting the particular set of resampled ultrasound frame data resulting in a smallest MAD value.

9. The method of claim 5, wherein the step e) comprises:

spatially compounding the first set of ultrasound frame data and the selected particular set of resampled ultrasound frame data to form a set of ultrasound compound frame data; and forming the ultrasound spatial compound image by using the set of ultrasound compound frame data.

10. A non-transitory computer-readable storage medium storing instructions that, when executed by a computer, cause the computer to perform a spatial compound image forming method comprising:

a) reading out a plurality of sets of ultrasound frame data corresponding to a plurality of frames based on echo signals from a target object from a storage unit, the plurality of sets of ultrasound frame data including a first set of ultrasound frame data formed based on non-steered scan lines and a second set of ultrasound frame data formed based on steered scan lines respectively steered at a predetermined steering angle;

b) resampling the second sets of frame data based on a plurality of sub steering angles set based on a permissible refraction range for the predetermined steering angle to form a plurality of sets of resampled frame data;

c) comparing the first set of ultrasound frame data with each of the sets including the second set of ultrasound frame data and the plurality of sets of resampled frame data to select a particular set of frame data; and d) spatially compounding the selected particular set of ultrasound frame data and the first set of ultrasound frame data to form an ultrasound spatial compound image.

11. The computer-readable storage medium of claim 10, wherein the step b) comprises:

defining the permissible refraction range for the predetermined steering angle;

setting the plurality of sub steering angles within the permissible refraction range; and resampling the second set of the frame data based on the plurality of sub steering angles to form the plurality of sets of resampled frame data.

12. The computer-readable storage medium of claim 10, wherein the plurality of sub steering angles are set by increasing or decreasing the predetermined steering angle by a predetermined angle within the permissible refraction range.

13. The computer-readable storage medium of claim 10, wherein the step c) comprises:

computing MAD values between the first set of ultrasound frame data and each of the sets including the second set of ultrasound frame data and the plurality of sets of resampled ultrasound frame data; and selecting the particular set of resampled ultrasound frame data resulting in a smallest MAD value.

14. The computer-readable storage medium of claim 10, wherein the step d) comprises:

spatially compounding the first set of ultrasound frame data and the selected particular set of resampled ultrasound frame data to form a set of ultrasound compound frame data; and forming the ultrasound spatial compound image by using the set of ultrasound compound frame data.

* * * * *